United States Patent [19]

Lundman

[11] Patent Number: 4,690,361
[45] Date of Patent: Sep. 1, 1987

[54] JACK STAND AND METHOD FOR MAKING A JACK STAND

[76] Inventor: Philip L. Lundman, 400 Wheeler Rd., Fredonia, Wis. 53021

[21] Appl. No.: 852,234

[22] Filed: Apr. 15, 1986

Related U.S. Application Data

[60] Continuation-in-part of Ser. No. 682,610, Dec. 17, 1984, abandoned, which is a division of Ser. No. 455,013, Jan. 3, 1983, abandoned.

[51] Int. Cl.$^4$ .............................................. E04G 25/00
[52] U.S. Cl. .................................. 248/352; 248/354.5
[58] Field of Search ...................... 248/352, 351, 354.5, 248/357, 158, 161, 413, 519; 254/DIG. 1, 11, 45, 133 R

[56] References Cited

U.S. PATENT DOCUMENTS

| | | | |
|---|---|---|---|
| 1,864,814 | 6/1932 | Gallagher et al. | 248/534 X |
| 3,062,157 | 11/1962 | Woods | 248/354.5 X |
| 4,042,202 | 2/1977 | Molinari | 248/352 |

FOREIGN PATENT DOCUMENTS 309011 3/1969 Sweden ............................ 248/354.5

OTHER PUBLICATIONS

"Sears Spring through Summer 1969" Sears, Roebuck and Co., Philadelphia, PA, p. 664.

Primary Examiner—Ramon S. Britts
Assistant Examiner—David L. Talbott
Attorney, Agent, or Firm—Michael, Best & Friedrich

[57] ABSTRACT

A jack stand and a method for manufacturing a jack stand of the type used in supporting a vehicle. A rectangular sheet metal plate is stamped so as to form at least two elongated parallel slots in the sheet metal plate, said elongated parallel slots being spaced apart from one another and each being spaced from the lateral sides of the sheet metal plate. The slots define three parallel planar legs integrally joined to a transverse body portion of the rectangular sheet metal plate. The rectangular sheet metal plate is bent such that the transverse body portion of the rectangular sheet metal plate forms a cylindrical body. The legs are each bent about a longitudinal axis and the free ends of the legs are bent radially outwardly away from one another so as to define a tetrahedral structure supporting the cylindrical body.

1 Claim, 6 Drawing Figures

JACK STAND AND METHOD FOR MAKING A JACK STAND

RELATED APPLICATIONS

This is a continuation-in-part application of U.S. patent application Ser. No. 682,610, filed Dec. 17, 1984, a divisional of U.S. patent application Ser. No. 455,013 filed Jan. 3, 1983 now both abandoned.

FIELD OF THE INVENTION

The present invention relates to jack stands of the type for use by mechanics in supporting a vehicle while the vehicle is being worked on and methods for manufacturing jack stands.

BACKGROUND OF THE PRIOR ART

Jack stands are commonly used by mechanics in connection with maintenance work on vehicles, and a substantial market for jack stands is to vehicle owners who do their own maintenance work. Jack stands for sale to vehicle owners are commercially practical only if the jack stands can be manufactured at very low cost. While the manufacturer must produce a product at a very competitive price due to the large number of manufacturers in the industry, these manufacturers must also produce a high strength product fully capable of supporting the weight of a vehicle.

In one common prior art method for manufacturing jack stands, the jack stands include a base portion comprised of a cylindrical portion supported by three legs integrally joined to the cylindrical portion. A tubular member is housed in the cylindrical portion in a telescoping manner and includes an upper end adapted to support the axle or some other portion of the vehicle. The legs of the base portion diverge downwardly and outwardly from the cylindrical portion so as to define a generally tetrahedral shape. Brace members are welded to the lower ends of the legs to rigidly join the legs.

In a common form of the prior art, the base portion of the jack stand is manufactured from steel tubing having a diameter substantially the same as that of the cylindrical portion to be formed. The tubing is cut in lengths approximately equal to the vertical height of the jack stand base portion. Elongated longitudinally extending slits are formed in one end of the steel tubing. These slits have a length of approximately one-half to three-fourths of the length of the tubing and function to form three legs integrally joined to a cylindrical collar portion. The ends of the legs are then pulled outwardly so as to form the outwardly diverging legs of the jack stand. Braces are then welded to the lower ends of these outwardly diverging legs. The legs formed in this manner have a curved configuration when viewed in a horizontal cross-section and the legs will each define an arc of about 120°. This curved configuration of the legs provides legs which have substantial strength yet having a simple or simplified construction.

One of the drawbacks of this prior art construction is, however, that the elongated steel tubing used as the raw material in making the base portion of the jack is relatively expensive, particularly in view of the competitive nature of the product.

SUMMARY OF THE INVENTION

The present invention provides an improved and less expensive method for manufacturing jack stands and provides a jack stand having strength greater than the prior art products.

The present invention includes a method for forming a jack stand wherein the base portion of the jack stand is formed from sheet metal stock rather than from the much more expensive welded steel tubing. The method of the invention also produces a jack stand having a strength greater than jack stands produced from steel tubing, and while using much less expensive materials, provides for the manufacture of a jack stand requiring little more labor and manufacturing expense than the prior art method employing the welded steel tubing as the base material.

More particularly, the invention includes a method for manufacturing a jack stand comprising the steps of providing a rectangular sheet metal plate, and stamping the rectangular sheet metal plate so as to form at least two elongated parallel slots in the sheet metal plate, the elongated parallel slots being spaced apart from one another and each being spaced apart from the lateral sides of the sheet metal plate by a distance substantially the same as the distance between the slots, the slots defining three parallel planar legs, and the legs each including opposite ends, one end being integrally joined to a transverse body portion of the rectangular sheet metal plate. The method also includes the steps of bending the rectangular sheet metal plate to form a cylinder such that the transverse body portion of the rectangular sheet metal plate forms a cylindrical collar having a central longitudinal axis, moving the other of the opposite ends of the legs radially outwardly away from the central longitudinal axis whereby the legs will diverge outwardly away from one another and away from the cylindrical collar.

The invention also includes a jack stand of the type for use in supporting a vehicle, the jack stand comprising a base portion having a generally cylindrical upper body portion formed from a flat steel plate bent around a longitudinal axis so as to form a cylinder, and including lateral edges welded together to form a seam. The base portion also includes a plurality of legs adapted to support the cylindrical upper body portion. The legs each include an upper end and a lower end, the upper ends of the legs being integrally joined to the upper body portion, and the legs each being formed from the flat sheet metal plate and being bent about a longitudinal axis. The legs diverge with respect to the longitudinal axis of the cylindrical upper body portion and in the direction away from the upper body portion. Means are also provided for fixedly joining the lower ends of the legs together in spaced apart relation. The means for joining the lower ends of the legs together can comprise a one piece triangular brace member, the corners of the triangular brace member being welded to the lower ends of the legs and thereby providing a rigid structure for supporting those legs. The jack stand also includes a vehicle supporting member having a cylindrical portion housed in the cylindrical upper body portion in telescoping relation and having an upper end adapted to support a vehicle. The cylindrical portion of the vehicle supporting member is supported in the cylindrical upper body portion of the base by at least one pin extending diametrically through aligned holes provided in the cylindrical portion of the vehicle supporting member and in the cylindrical upper body portion of the base. The holes are formed by a punching operation, and the punched metal is extruded in the areas of the holes to form a circular flange of work hardened metal surrounding the holes.

One of the features of the invention is that a jack stand constructed in accordance with the invention is stronger than a prior art jack stand of comparable weight, and the raw materials to be used in the manufacturing operation are less costly than those employed in prior art methods, such that the unit price of the resultant product can be significantly less than the prior art jack stands produced from welded steel tubing.

Various other features and advantages of the invention will be apparent by reference to the following description of a preferred embodiment, from the claims, and from the drawings.

Figure 1:
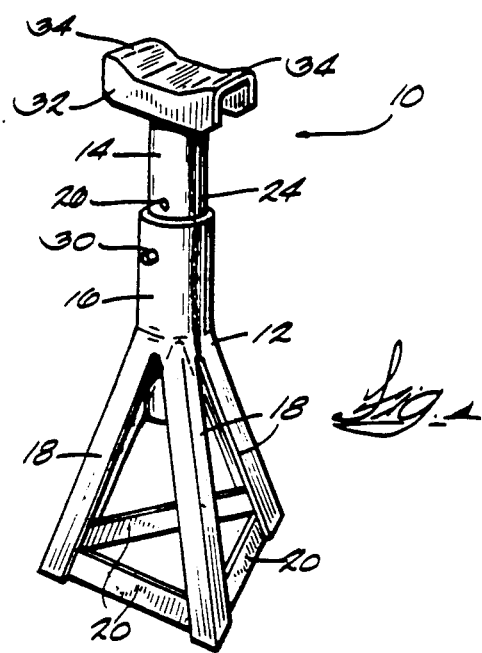
FIG. 1 is a perspective view of a jack stand embodying the invention.

Before describing at least one embodiment of the invention in detail, it is to be understood that the invention is not limited in its application to the details of construction and to the specific steps set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is a jack stand 10 embodying the invention and generally including a base 12 and a telescoping load supporting structure or column 14 supported by the base 12. The base 12 is generally comprised of a hollow tubular upper portion 16 supported by three legs 18 which are integrally joined to the tubular upper portion or cylindrical collar 16 and which extend downwardly and diverge outwardly from a lower end of the tubular upper portion 16. The legs 18 are equally spaced-apart around the circumference of the upper tubular portion 16 or with respect to the longitudinal axis of the tubular upper portion and diverge with respect to one another and with respect to a line including the longitudinal axis of the tubular upper portion. The legs 18 are thus arranged so as to form an open structure of tetrahedral shape.

The lower ends of the legs 18 are fixedly or rigidly joined together by rigid braces 20. While the braces 20 could have various constructions, in the illustrated arrangement, the braces 20 comprise elongated generally planer sheet metal bars having one end spot welded to a lower end of one of the legs 18 and an opposite end spot welded to the lower end of another of the legs 18, so as to rigidly support those legs in spaced apart relation.

While the legs 18 could have other constructions, in a preferred form of the invention, each of the legs is bent around its longitudinal axis such that when viewed in a generally horizontal cross-section, the legs each define an angle or "V". By constructing the legs such that they are V-shaped when viewed in horizontal cross-section, the legs of the jack stand are substantially stronger than legs of jack stands constructed from cylindrical tubing and wherein the legs have an arcuate cross section. It will be appreciated by reference to the legs of the jack stand in horizontal cross section that legs having a V-shaped cross section and as embodied in applicant's invention are thicker in the direction extending outwardly from the vertical centerline of the jack stand than legs of the prior art constructions wherein the legs define an arcuate curve when viewed in horizontal cross section, and are accordingly more resistant to bending than the prior art constructions.

The load supporting structure 14 comprises an elongated cylindrical member 24 having an outside diameter slightly less than the inside diameter of the tubular upper portion 16 of the base 12 and such that the cylindrical member 24 can be slideably housed in the tubular upper portion 16 for vertical adjustment. The elongated cylindrical member 24 also includes a plurality of pairs of aligned bores 26 in spaced-relation along its length. The pairs of aligned bores 26 are adapted to be aligned with a similar pair of aligned bores 28 (FIG. 3) in the upper tubular member 16, and whereby a pin 30 can be slideably inserted through the aligned bores 26 and 28. The upper end of the load supporting structure 14 includes a cross member 32 adapted to support a portion of the vehicle such as the vehicle axle. In a preferred form of the invention, the cross member 32 includes a pair of raised ears 34 at its opposite ends and so as to prevent the vehicle axle housed therebetween from falling off the jack stand 10.

Figure 2:
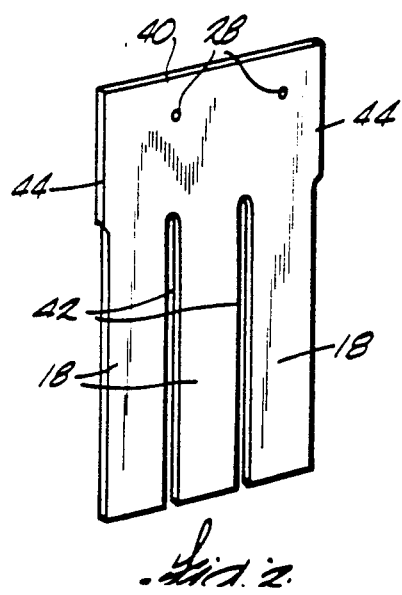
FIG. 2 is a perspective view of the sheet stock employed in the production of the base portion of the jack stand illustrated in FIG. 1, and stamped during one of the forming steps of the method embodying the invention.

Referring now to the method for manufacturing the jack stand 10 embodying the invention, in a preferred form of the invention the base portion 12 of the jack stand 10 is formed from flat sheet stock or sheet metal 40 (FIG. 2). The sheet metal 40 is subjected to a stamping operation so as to form a pair of bores 28 and a pair of parallel spaced slits 42, the slits 42 each having a length substantially equal to the length of the legs to be formed, and the slits 42 being parallel to the lateral sides 44 of the sheet stock 40.

Figure 3:
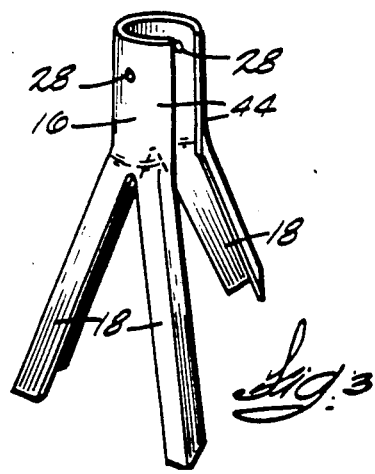
FIG. 3 is a perspective view of the base portion of the jack stand illustrated in FIG. 1 as it exists in an intermediate step of the method used to manufacture the jack stand illustrated in FIG. 1.

The stamped plate 40 is then rolled or otherwise bent about a longitudinal axis parallel to the lateral sides 44 of the sheet stock 40 and so as to form a cylinder as illustrated in FIG. 3. Each of the portions of the sheet metal plate 40 defining one of the legs 18 is bent about a line intermediate the lateral edges of the leg 18 and parallel to the longitudinally extending slots 42 such that each of these leg members 18 will be curved or bent when viewed in cross section perpendicular to the longitudinal direction of the legs. In the illustrated arrangement, the legs 18 are each bent in such a manner as to have a generally V-shaped configuration.

The lower ends of the legs 18 are also pulled outwardly with respect to the longitudinal axis of the cylindrical portion 16 of the base such that the legs 18 will diverge uniformly outwardly and downwardly. The lateral sides or edges 44 of that portion of the sheet stock material forming the upper cylindrical portion 16 of the base are then seam-welded as illustrated in FIG. 1 such that the upper cylindrical portion 16 is a uniform cylindrical structure. The brace members 20 are then welded at their opposite ends to the lower ends of the legs 18 so as to hold the legs in spaced apart fixed relation and to rigidify the lower portion of the base portion 16 of the jack stand 12.

The upper vehicle support member 14 can similarly be conveniently manufactured from flat sheet stock wherein a plurality of holes 26 are stamped in the sheet stock. The sheet is then rolled in the manner illustrated in FIG. 3 such that the tubular portion 24 is formed. The edges of the tubular portion can then be seam-welded and the upper vehicle supporting member or saddle 32 can then be welded to the upper end of the tubular portion 24.

One of the principle advantages of applicant's invention is that steel is more readily available in a greater number of strengths and hardnesses in sheet steel form than in a tubing form. It has been found that the preferred steel for use in jack stands is substantially less expensive when purchased in sheet steel form than when purchased in the form of tubing. While tubing comprised of such steel may be obtained, it is not readily available, and is accordingly expensive.

Figure 4:
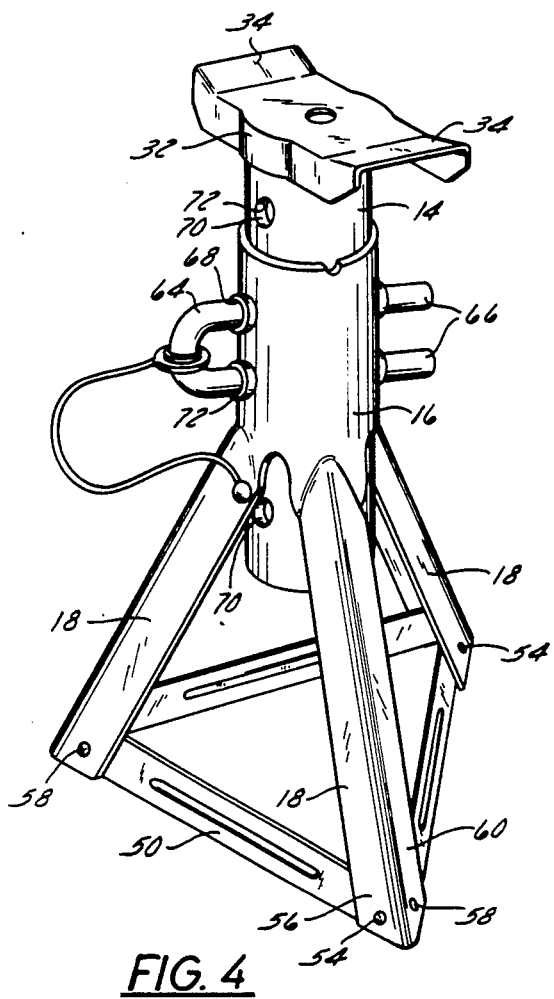
FIG. 4 is an enlarged perspective view of an alternative embodiment of the invention.
Figure 5:
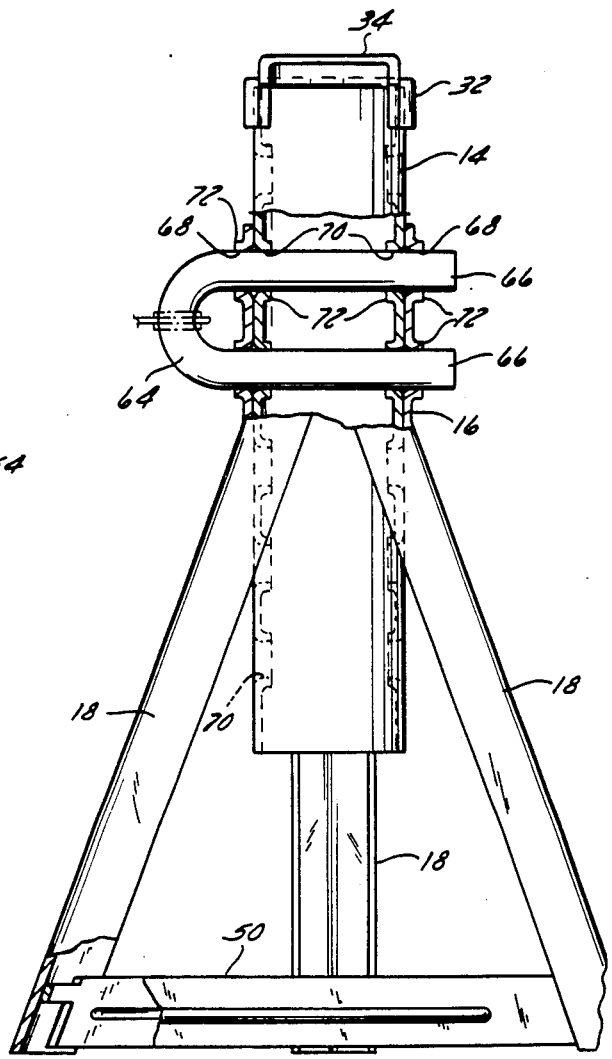
FIG. 5 is an enlarged elevation view of the jack shown in FIG. 4 and with portions shown in section.
Figure 6:
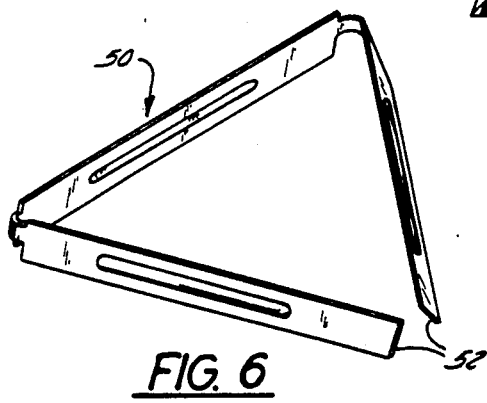
FIG. 6 is a perspective view of a triangular brace member used in the jack stand shown in FIG. 4.

A second embodiment of the invention is set forth in FIGS. 4-6. In the construction shown there, the braces 20 are replaced by a one piece triangular brace member 50 (FIG. 6). The triangular brace member 50 is comprised of an elongated strip of steel bent so as to form an equilateral triangle and with the opposite ends 52 of the elongated strip joined together such as by welding. The corners of the triangular brace 50 are then secured to the lower ends of the legs 18. In a preferred form of the invention the corners of the triangular brace member are wire welded to the legs 18, with a first weld 54 extending through one planar portion 56 of the leg 18 into an opposed adjacent portion of the corner of the brace member 50 and a second wire weld 58 extending through the other planar portion 60 of the lower end of the leg into an opposed adjacent portion of the corner of the brace member. Each of the corners of the triangular brace member are thus secured in place by two welds 54 and 58. By constructing the triangular brace member 50 as a one piece unit, the lower ends of the legs are rigidly secured with respect to one another, and the strength of the lower portion of the jack stand is greater than a jack stand comprised of comparable materials and having three separate braces joining the lower ends of the legs.

In the embodiment of the invention illustrated in FIGS. 4-6, the telescoping load supporting column is supported by a U-shaped pin 64, the pin 64 having a pair of legs 66 extending through pairs of aligned holes 68 and 70 provided in the cylindrical body portion 16 of the jack stand and in the load supporting column 14. In a preferred form of the invention, the holes 68 and 70 are formed by a punching and extruding operation prior to bending of the sheet stock to form the cylindrical structures of the finished product. During the punching operation, the metal surrounding the holes 68 and 70 is extruded so that when the hollow tubular upper portion of the base is formed, the metal surrounding the holes forms a circular flange or ridge 72 surrounding each hole and projecting outwardly from the outer cylindrical surface. The extruded material surrounding the hole provides a larger surface area for supporting the pins, and also provides an area of increased metal thickness in the area housing the pins. The holes in the telescoping post portion similarly include inwardly extruded flanges or ridges 72.

By forming these holes with a punching and extruding operation when the sheet stock is flat provides for work hardening of the metal in the area of the holes. The material surrounding the holes 68 and 70 is thus stronger and less resistant to deformation than would otherwise be the case if the holes are formed by drilling holes in the sheet metal stock or in the finished cylindrical portion of the jack stand and in the telescoping post.

Various features of the invention are set forth in the following claims:

I claim:

1. A jack stand of the type for use in supporting a vehicle, the jack stand comprising:
   a base portion including,
   a generally cylindrical upper body portion including a central cylindrical chamber and a central longitudinal axis, said cylindrical upper body portion being formed from a first portion of a flat steel plate bent around said longitudinal axis so as to form a cylinder, said flat steel plate including lateral edges welded together to form a vertical linear welded seam parallel to said central longitudinal axis of said cylindrical upper body portion, said cylindrical upper body portion including an aperture therein, said aperture being surrounded by a flange formed by extruding metal surrounding said aperture, and said flange extending outwardly with respect to said longitudinal axis,
   a plurality of legs adapted to support said cylindrical upper body portion, each of said plurality of legs including an upper end and a lower end, said upper ends of said legs being integrally joined to said cylindrical upper body portion, said plurality of legs being formed from a second portion of said flat steel plate, and said plurality of legs each including a longitudinal axis, and said legs diverging with respect to said central longitudinal axis of said cylindrical upper body portion and in the direction away from said upper body portion, and said welded seam defining a line bisecting the angle defined by said longitudinal axis of a first one of said legs and said longitudinal axis of a second one of said legs, and each of said legs being bent about a bend line parallel to said longitudinal axis so as to include a first elongated planar leg portion and a second elongated planar leg portion joined at said bend line, said first elongated planar leg portion and said second elongated planar leg portion defining an angle therebetween of substantially 60°, and the lower end of the first elongated planar leg portion of a first one of said legs being coplanar with the lower end of a second elongated planar leg portion of a second one of said legs, and the second elongated planar leg portion of said first one of said legs including a portion coplanar with a portion of the first elongated planar leg portion of a third one of said legs and the first elongated planar leg portion of the second one of the legs including a portion coplanar with a portion of the second elongated planar leg portion of said third one of said legs, and said bend line formed between said first elongated planar leg portion and said second elongated planar leg portion of at least one of said legs extending into said cylindrical upper body portion, and brace means for fixedly joining said lower ends of said legs together in spaced apart relation, said brace means including a one piece triangular brace member, said triangular brace member including a first corner engaging said lower end of one of said legs, said first corner including a first planar portion welded in face to face relation to said lower end of the first elongated planar leg portion of said first one of said legs and a second planar portion welded in face to face relation to said lower end of the second elongated planar leg portion of said one of said legs, a second corner engaging said lower end of a second one of said legs, said second corner including a first planar portion welded in face to face relation to said first planar portion of a second one of said legs and a second planar portion welded in face to face relation to said second planar portion of said second one of said legs, and a third corner engaging said lower end of a third one of said legs, said third corner including a first planar portion welded in face to face relation to said first planar portion of a third one of said legs and a second planar portion welded in face to face relation to said planar portion of said third one of said legs, a vehicle supporting member including a cylindrical portion housed in said generally cylindrical upper body portion in telescoping relation and having an upper end adapted to support a vehicle, said cylindrical portion of said vehicle supporting member including an aperture therein, said aperture being surrounded by a flange, said flange extending inwardly with respect to said longitudinal axis and being formed by extruding metal surrounding said aperture inwardly with respect to said longitudinal axis, pin means extending through said apertures in said cylindrical upper body portion and in said cylindrical portion of said vehicle supporting member.

* * * * *